United States Patent Office 3,123,623
Patented Mar. 3, 1964

3,123,623
6-AMINO-4-PREGNENE-3,20-DIONE AND N-ACYL DERIVATIVES THEREOF
Kanzo Sasaki, Osaka, Japan, assignor to Shionogi & Co., Ltd., Osaka, Japan
No Drawing. Filed July 11, 1963, Ser. No. 294,446
Claims priority, application Japan July 17, 1962
7 Claims. (Cl. 260—397.3)

The present invention relates to 6-amino-4-pregnene-3,20-dione and N-acyl derivatives thereof which are represented by the formula:

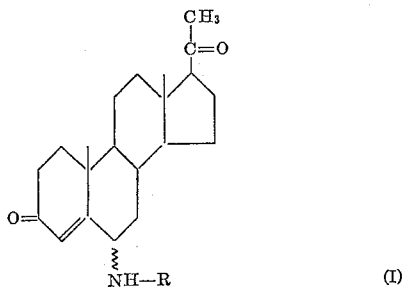

wherein R is a hydrogen atom or a lower alkanoyl group (e.g. acetyl, propionyl, butyryl, valeryl) and the ripple mark ($\xi$) represents a generic indication of $\alpha$- and $\beta$-configurations.

It is an object of the present invention to provide 6-amino-4-pregnene-3,20-dione and N-acyl derivatives thereof. Another object of the invention is to provide physiologically active 6-amino-4-pregnene-3,20-dione and N-acyl derivatives thereof. Other objects will be apparent to those conversant with the art to which this invention pertains.

The objective 6-amino-4-pregnene-3,20-dione and N-acyl derivatives thereof can be prepared from 5α-hydroxy-6β-aminopregnane-3,20-dione and N-acylates thereof according to the following scheme:

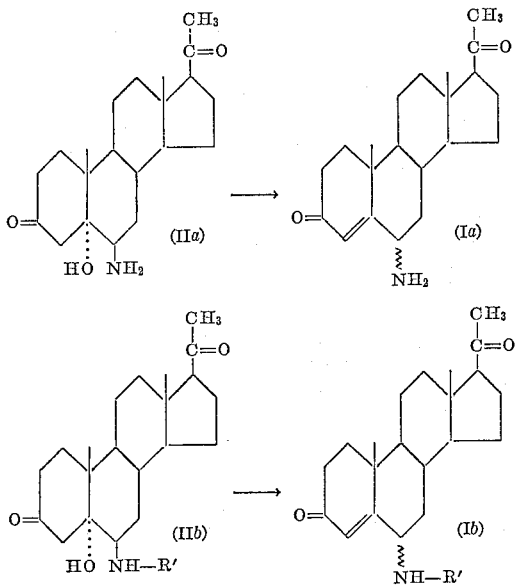

wherein R' is a lower alkanoyl group (e.g. acetyl, propionyl, butyryl, valeryl).

The starting amine (IIa) and acylamine (IIb) are novel and can be prepared from a known compound, 5α,6α-epoxypregnane-3,20-dione 3,20-bisethyleneketal [Bowers et al.: Tetrahedron, vol. 7, p. 138 (1959)], by subjecting the latter to react with sodium azide in an inert solvent medium such as methanol, ethanol, ether, tetrahydrofuran and dioxane at a temperature from 80 to 150° C. in a sealed tube and reducing the resulting 5α-hydroxy-6β-azidopregnane-3,20-3,20-bisethyleneketal with lithium aluminum hydride in an inert organic solvent medium such as benzene, ether, tetrahydrofuran and dioxane at a temperature from room temperature (15 to 30° C.) to the boiling point of the employed solvent, followed by deketalation in a conventional manner and, if necessary, acylation in a conventional manner.

According to the process of the present invention, the starting amine (IIa) or acylamine (IIb) is treated with a dehydrating agent to give the corresponding $\Delta^4$-amine (Ia) or $\Delta^4$-acylamine (Ib). As the dehydrating agent, there may be employed an acid such as hydrochloric acid, sulfuric acid, acetic acid and p-toluenesulfonic acid, a halogenating agent such as phosphorus oxychloride, phosphorus oxybromide and phosphorus trichloride or a sulfonylating agent such as thionyl chloride and thionyl bromide. As the configuration of the amino or acylamino group at the 6-position of the objective $\Delta^4$-amine (Ia) or $\Delta^4$-acylamine (Ib) is associated with the acidity of the reaction medium, a suitable selection of the dehydrating agent and the reaction solvent in accordance with the object is required. There is generally produced the $\Delta^4$-6α-amine (Ia') or $\Delta^4$-6α-acyl amine (Ib') under an ordinary acidic condition, because of the much greater stability of the same than the 6β-isomer thereof. When the production of the $\Delta^4$-6β-amine (Ia") or $\Delta^4$-6β-acylamine (Ib') is intended, there is required a somewhat suppressed acidic condition. For instance, a combination of a sulfonylating agent such as thionyl bromide with a base such as pyridine and picoline is advantageously used as the dehydrating agent for attaining this object. The reaction readily proceeds by treating the starting amine (IIa) or acylamine (IIb) with the suitably selected dehydrating agent at a wide range of temperature, for instance, from —20 to 100° C. (preferably while cooling with ice), if necessary in the presence of an inert solvent medium such as ether, dioxane, acetone, benzene and acetic acid. When the $\Delta^4$-6β-amine (Ia") or $\Delta^4$-6β-acylamine (Ib") is obtained, it may be further treated with an acidic substance such as hydrochloric acid whereby the same is readily converted into the corresponding 6α-isomer. In general, the $\Delta^4$-amine (Ia) is relatively unstable and can be difficultly purified. Accordingly, it is acylated in a conventional procedure, e.g. treatment with a mixture of alkanoic anhydride and pyridine, to the corresponding $\Delta^4$-acylamine (Ib) which is stable and can be readily purified by a conventional procedure such as extraction and crystallization.

With respect to the hereinabove disclosure, it should be understood that it only illustrates a typical procedure for carrying out the present invention and some modifications may be apparent to those conversant with the art to which the present invention pertains without departing from the spirit of the invention. Such modifications include, for instance, the execution of the above disclosed reaction using 5α-hydroxy-6β-amino or acylamino-pregnane-3,20-dione 3,20-bisethyleneketal instead of the amine (IIa) or acylamine (IIb) as the starting material to produce the Δ⁴-amine (Ia) or Δ⁴-acylamine by one step.

The thus produced Δ⁴-amine (Ia) and Δ⁴-acylamine (Ib) are useful as CNS (central nervous system) depressing agents. For instance, 6α-acetylamino-4-pregnene-3,20-dione produced anesthetic state for 6 to 8 hours in mice weighing about 16 grams, when administered at a dose of 0.3 milligram per mouse by intra-peritoneal route.

The following examples are given solely for the purpose of illustration and are not intended to be construed as limitations of this invention.

*Example 1*

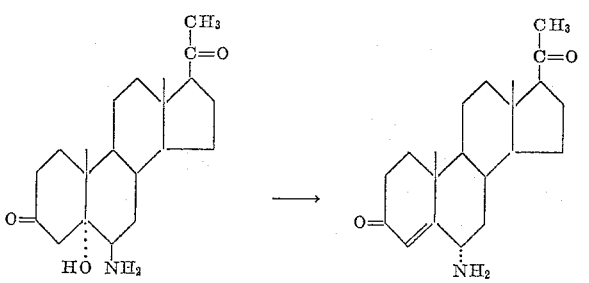

A solution of 5α-hydroxy-6β-aminopregnane-3,20-dione p-toluenesulfonate (240 mg.) in glacial acetic acid (8 ml.) is bubbled with dried hydrogen chloride for 40 minutes. The reaction mixture is added to an aqueous solution of sodium hydroxide. The resulting mixture is saturated with sodium chloride and shaken with dichloromethane. The dichloromethane phase is shaken with 5% hydrochloric acid. The hydrochloric acid phase is made alkaline with sodium hydroxide, saturated with sodium chloride and extracted with dichloromethane. The dichloromethane extract is washed with water, dried over anhydrous sodium sulfate and evaporated to give 6α-amino-4-pregnene-3,20-dione (54 mg.) as yellow crystals melting at 140 to 148° C. (decomp.).

IR: $\nu_{max.}^{Nujol}$ 3388, 3308, 1794, 1660, 1610 cm.⁻¹
UV: $\lambda_{max.}^{ethanol}$ 240 m$\mu$ ($\epsilon$, 12,400)

5α-hydroxy-6β-aminopregnane-3,20-dione is subjected to reaction in the same manner as above whereby 6α-amino-4-pregnene-3,20-dione is produced.

The starting material of this example, 5α-hydroxy-6β-aminopregnane-3,20-dione, is produced from a known steroid, 5α,6α - epoxypregnane-3,20-dione 3,20-bisethyleneketal according to the following scheme:

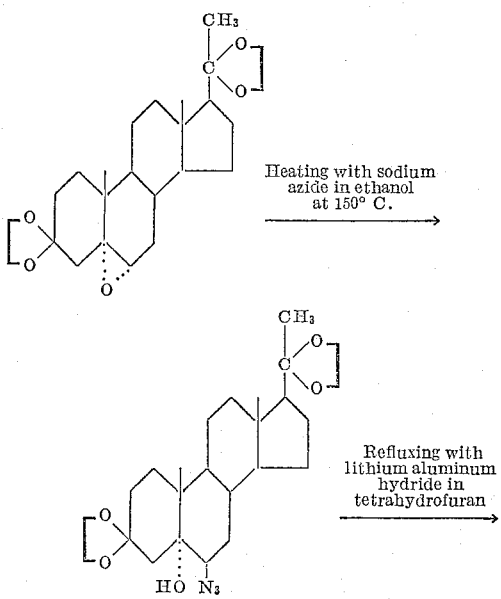

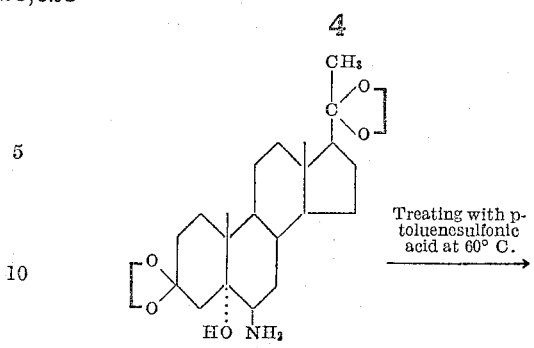

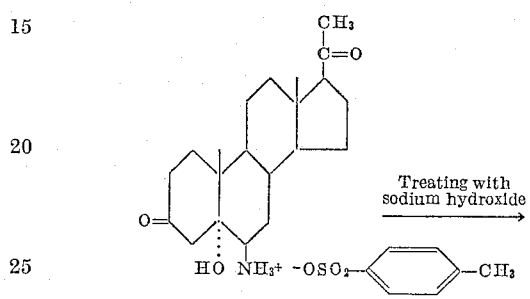

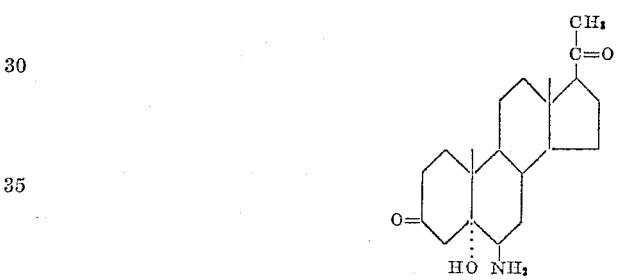

*Example 2*

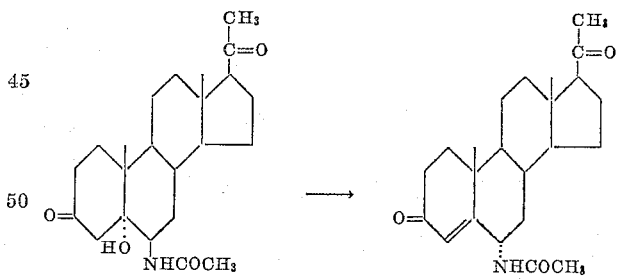

A solution of 5α-hydroxy-6β-acetylaminopregnane-3,20-dione (43 mg.) in glacial acetic acid (2 ml.) is bubbled with dried hydrogen chloride for 30 minutes while cooling with ice and then allowed to stand for 2 hours while cooling with ice. To the reaction mixture, there is added water (2 ml.), and the resultant mixture is shaken with dichloromethane. The dichloromethane phase is washed with water, dried over anhydrous sodium sulfate and evaporated under reduced pressure. The residue is crystallized from ether and recrystallized from a mixture of acetone and ether to give 6α-acetylamino-4-pregnene-3,20-dione (23 mg.) as crystals melting at 122 to 124° C. [α]$_D^{24}$ +118±2° (c., 0.996 in chloroform).

UV: $\lambda_{max.}^{ethanol}$ 240 m$\mu$ ($\epsilon$, 13,700). IR: $\nu_{max.}^{chloroform}$ 3436, 3326, 1703, 1675, 1664, 1621, 1513, 1506, 1361 cm.⁻¹

*Analysis.*—Calcd. for $C_{23}H_{33}O_3N$: C, 74.36; H, 8.75; N, 3.77 Found: C, 74.39; H, 9.00; N, 3.58.

The starting material of this example, 5α-hydroxy-6β-acetylaminopregnane-3,20-dione, is produced from 5α- hydroxy - 6β-aminopregnane-3,20-dione 3,20-bisethylene-ketal according to the following scheme:

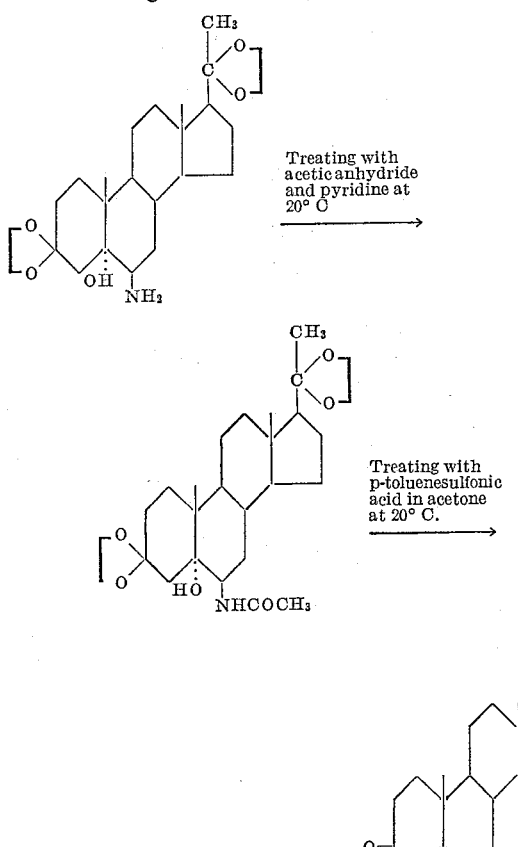

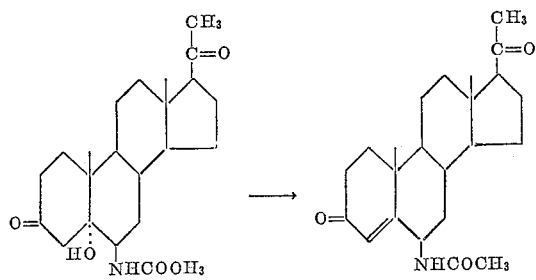

Example 3

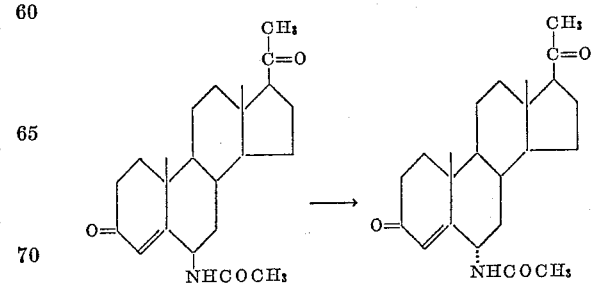

To a solution of 5α-hydroxy-6β-acetylaminopregnane-3,20-dione (316 mg.) in pyridine (5 ml.), there is added a solution of thionyl chloride (2 ml.) in pyridine (2 ml.) with stirring while cooling with ice. After continuation of stirring for 5 minutes while cooling with ice, the reaction mixture is added to water (150 ml.). The resulting mixture is saturated with sodium chloride and shaken with chloroform. The chloroform phase is washed with 5% hydrochloric acid, 5% sodium carbonate and water in order, dried over anhydrous sodium sulfate and evaporated under reduced pressure. The resulting oil is treated with activated carbon and crystallized from a mixture of acetone and ether to give 6β-acetylamino-4-pregnene-3,20-dione (140 mg.) as crystals melting at 228 to 230° C. $[\alpha]_D^{22.5}$ +108±2° (c., 0.841 in chloroform).

UV: $\lambda_{max.}^{ethanol}$ 240 mμ (ε, 13,200). IR: $_{max.}^{chloroform}$ 3450, 3380, 1705, 1680, 1675, 1620, 1500, 1363 cm.$^{-1}$

*Analysis.*—Calcd. for $C_{23}H_{33}O_3N$: C, 74.36; H, 8.95; N, 3.77. Found: C, 74.41; H, 9.05; N, 3.72.

Example 4

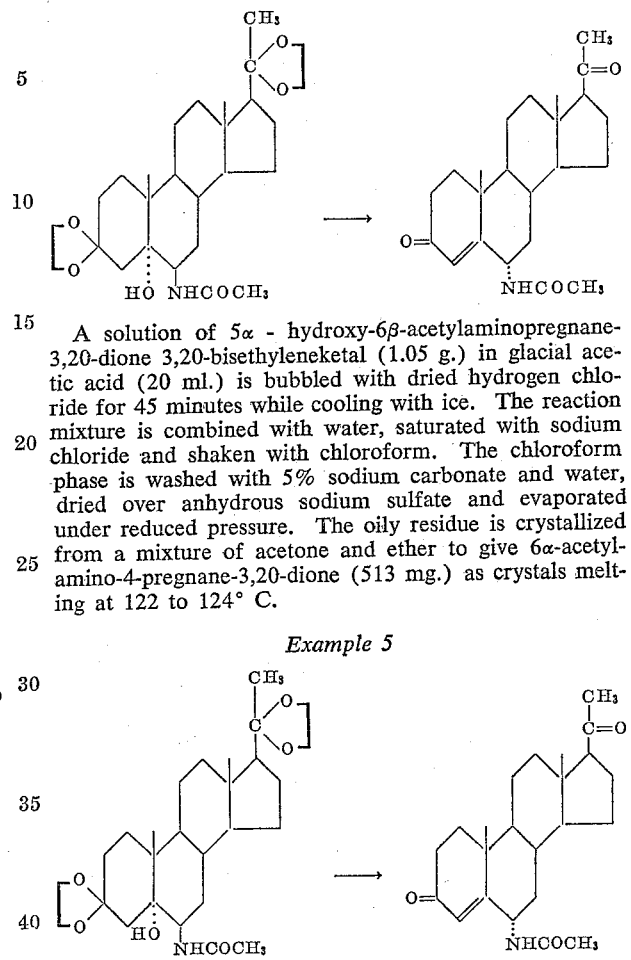

A solution of 5α - hydroxy-6β-acetylaminopregnane-3,20-dione 3,20-bisethyleneketal (1.05 g.) in glacial acetic acid (20 ml.) is bubbled with dried hydrogen chloride for 45 minutes while cooling with ice. The reaction mixture is combined with water, saturated with sodium chloride and shaken with chloroform. The chloroform phase is washed with 5% sodium carbonate and water, dried over anhydrous sodium sulfate and evaporated under reduced pressure. The oily residue is crystallized from a mixture of acetone and ether to give 6α-acetylamino-4-pregnane-3,20-dione (513 mg.) as crystals melting at 122 to 124° C.

Example 5

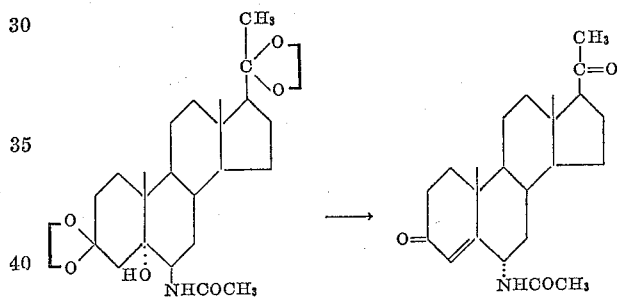

To a solution of 5α-hydroxy-6β-acetylaminopregnane-3,20-dione 3,20-bisethyleneketal (80 mg.) in a mixture of acetone (2 ml.) and dioxane (1 ml.), there is added p-toluenesulfonic acid (90 mg.), and the resulting mixture is stirred at room temperature (15 to 30° C.) for 17 hours. Then, the mixture containing 5α-hydroxy-6β-acetylaminopregnane-3,20-dione is heated at 70° C. for 10 minutes to make a clear solution. After stirring at the same temperature for 3 hours, water is added thereto. The resultant mixture is shaken with chloroform. The chloroform phase is washed with 5% sodium carbonate and water in turn and evaporated. The residue is crystallized from a mixture of acetone and ether to give 6α-acetylamino-4-pregnene-3,20-dione (35 mg.) as crystals melting at 122 to 124° C.

Example 6

A solution of 6β-acetylamino-4-pregnene-3,20-dione (50 mg.) in glacial acetic acid (1.5 ml.) is bubbled with dried hydrochloric acid for 40 minutes while cooling with ice. The reaction mixture is combined with water, saturated with sodium chloride and shaken with chloroform. The chloroform phase is washed with 5% sodium carbonate and water and evaporated. The oily residue is crystallized from a mixture of acetone and ether to give 6α-acetylamino-4-pregnene-3,20-dione (40 mg.) as crystals melting at 120 to 124° C.

*Example 7*

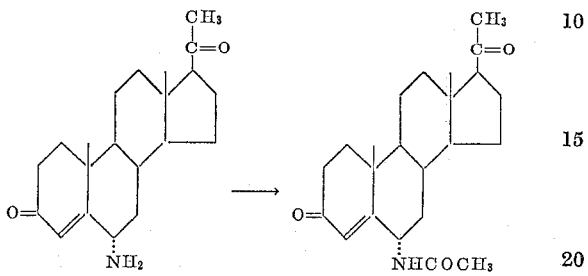

6α-amino-4-pregnene-3,20-dione is acetylated with acetic anhydride in pyridine at room temperature (15 to 30° C.) to produce 6α-acetylamino-4-pregnene-3,20-dione.

Having thus disclosed the invention what is claimed is:
1. A compound of the formula:

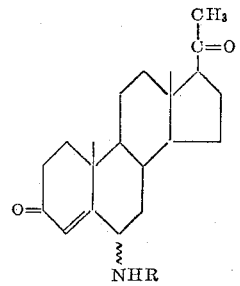

wherein R is a member selected from the group consisting of hydrogen and lower alkanoyl.
2. 6α-amino-4-pregnene-3,20-dione.
3. 6α-amino-4-pregnene-3,20-dione N-lower alkanoate.
4. 6β-amino-4-pregnene-3,20-dione.
5. 6β-amino-4-pregnene-3,20-dione N-lower alkanoate.
6. 6α-acetylamino-4-pregnene-3,20-dione.
7. 6β-acetylamino-4-pregnene-3,20-dione.

No references cited.